March 17, 1964 E. A. MOYANO 3,125,309
CHART DRIVE MECHANISM
Filed May 9, 1961 3 Sheets-Sheet 3
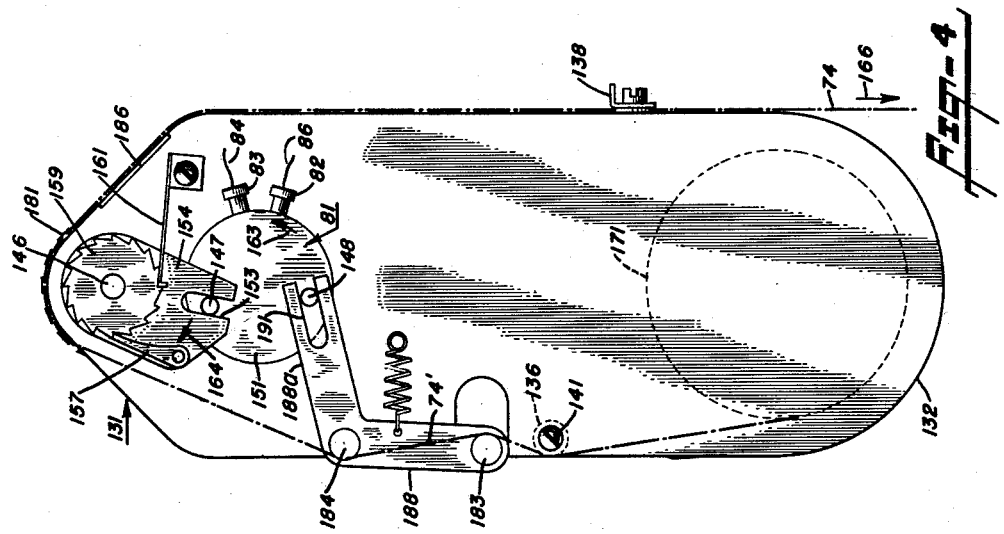
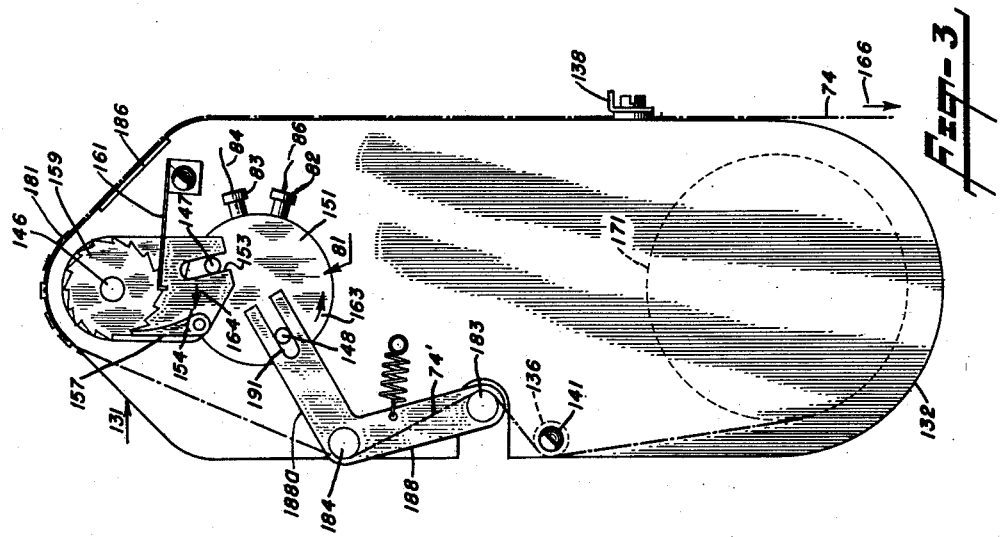
ERNESTO ALIAGA MOYANO
INVENTOR.
BY Rudolph J. Jurick
ATTORNEY United States Patent Office 3,125,309
Patented Mar. 17, 1964

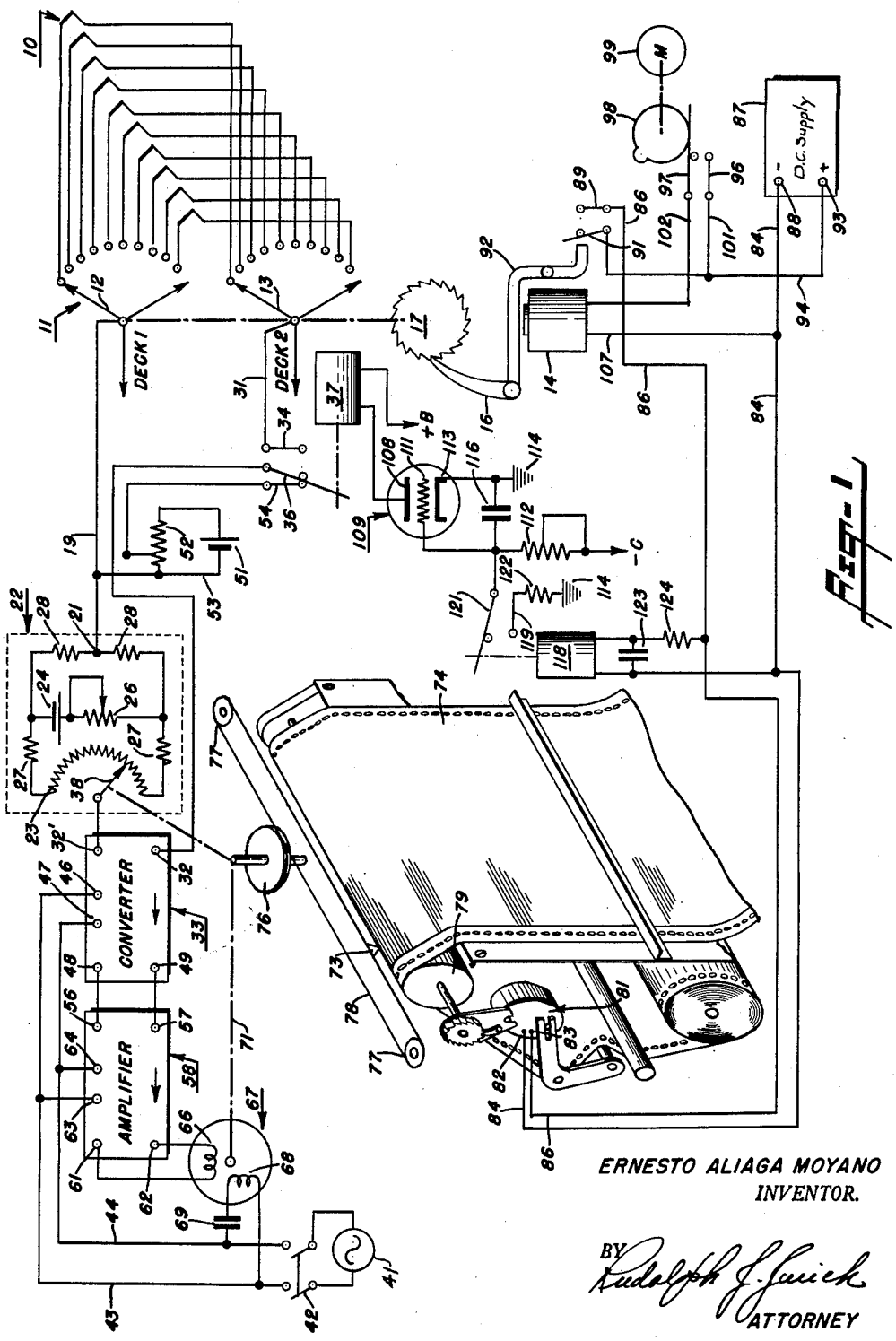

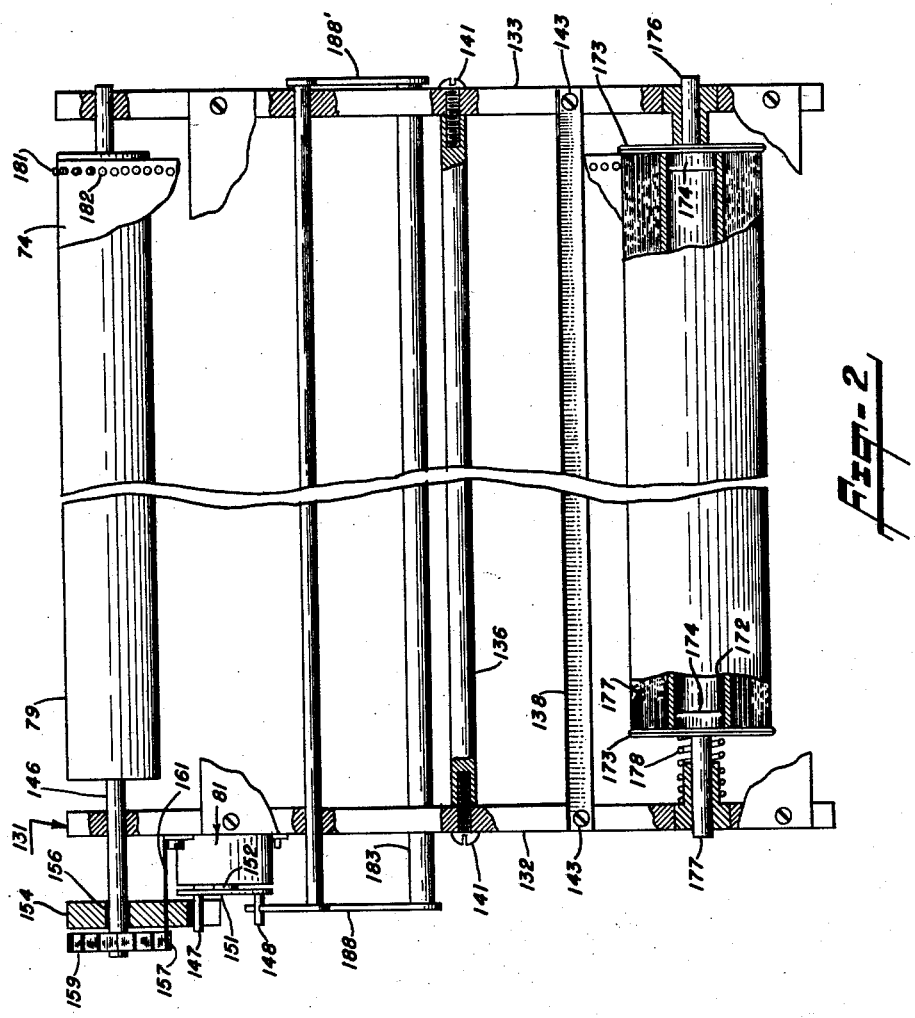

3,125,309
CHART DRIVE MECHANISM
Ernesto Alinga Moyano, New York, N.Y., assignor to Thermo Electric Co., Inc., Saddle Brook, N.J., a corporation of New Jersey
Filed May 9, 1961, Ser. No. 108,818
3 Claims. (Cl. 242—55)

This invention relates to a recording instrument and more particularly to the chart supply mechanism thereof.

In recording instruments of the type contemplated by my invention, a record of the value of a plurality of conditions is made upon a strip chart. The chart is moved intermittently, and a pin, or stylus, is utilized to make a record of the conditions thereon; the recording element being moved laterally across the chart to a position corresponding to the value of the condition under measurement. A plurality of voltage sources, such as thermocouples, for example, are successively connected one at a time, to a single self-balancing network in the recording instrument. The pen, or stylus, remains in recording contact with the chart at all times, and is moved thereacross only when the intermittently driven chart is stationary.

With an intermittently movable chart, the record may comprise either a series of spaced straight lines, or bars, all of which originate at a predetermined reference level and each having a length dependent upon the value of the input voltage to the balancing network, or the record may comprise a continuous line forming steps, with the lateral distance or height of each step being dependent upon the value of the input voltage. For a record comprising a series of straight lines, or bars, as first mentioned above, the stylus starts from a zero or other predetermined reference level, travels laterally off the chart to a position wherein the balancing network is balanced, and returns along the same path to the said reference level; the chart being stopped during the time the stylus is moving. With the reference level input to the recorder, the stylus is stationary and the chart is moved a step. After stopping, a succeeding input is applied to the balancing network and the above-described stylus movement repeated for such input. For a record of the profile of the inputs, wherein the record comprises a plurality of steps, as mentioned above, the stylus, instead of returning to zero, or other predetermined reference level after reaching each balancing condition, proceeds to the new balance point from the succeeding balance condition point. The above-described methods of operation are disclosed in detail in my copending patent application, Serial No. 130,561, filed August 10, 1961, and assigned to the assignee of the present invention. The present invention is directed to a novel chart drive mechanism for intermittent drive of the chart.

In accordance with well known practice, the chart is driven by means of a drive roller having a plurality of radially extending projections, or timing pins, adjacent one edge thereof which project through apertures in the margin of the chart whereby driving engagement between the chart and drive roller is effected. The apertures in the chart are located at a predetermined spaced distance from the right margin thereof, whereby the right margin is fixed against lateral movement with respect to the drive roller when properly engaged by the projections on the roller. The chart is drawn from a supply roll which is mounted upon a cylindrical core, or tube. For high speed operation, it is desired to stop and start the movement of the chart as rapidly as possible; the inertia of the moving system being an important factor in the rate at which the intermittent operation of the chart may be effected.

In accordance with my invention, the inertia effect of the supply roll (which is particularly heavy when the roll is full) is eliminated as a factor bearing upon the rate at which the chart may be intermittently driven. With my arrangement, a predetermined length of the chart is drawn off the supply roll prior to each drive actuation of the drive roller. That is, a loop is formed in the chart between the drive and supply rolls while the drive roll is stationary. Upon actuation of the drive roll, only that portion of the chart between the said drive and supply rolls is moved, without the unwinding of the supply roll. The ease with which a chart may be unwound from a supply roll will not affect the speed at which the chart may be intermittently driven. Hence, the fact that some chart rolls may unroll freely while others tend to unroll in a sticking manner wherein adjacent turns of the chart have a definite affinity for each other, will not be a contributing factor in the determination of the chart speed.

An object of this invention is the provision of a chart drive mechanism for recording instruments for intermittently driving the chart and alternately creating a slack in the length of the chart between the supply and drive rolls.

An object of this invention is the provision of a chart drive mechanism for intermittently driving the chart of a recording instrument by means of which the movement of the chart may be rapidly started and stopped.

An object of this invention is the provision of a recording instrument having a chart drive roll which functions to take up slack in the chart between the said drive roll and a supply roll, without functioning to unwind the chart from the supply roll.

An object of this invention is the provision of a strip chart recording instrument of the type in which the chart is intermittently driven by a drive roller, the improvement comprising intermittently unwinding thte chart from a supply roll while the chart drive roll is stationary.

These and other objects and advantages will become apparent from the following description when taken with the accompanying drawings. It will be understood, however, that the drawings are for purposes of illustration and are not to be construed as defining the scope or limits of the invention, reference being had for the latter purpose to the appended claims.

In the drawings wherein like reference characters denote like parts in the several views:

FIGURE 1 is a simplified diagrammatic presentation of a potentiometric recorder circuit and a chart drive mechanism which embodies my invention;

FIGURE 2 is a front elevational view, with parts in section and parts broken away for clarity, of my novel chart drive mechanism;

FIGURE 3 is a side elevational view of the mechanism; and

FIGURE 4 is similar to FIGURE 3 only showing the chart advance solenoid in an energized condition.

Reference is first made to FIGURE 1 wherein there is shown a plurality of thermocouples 10 which may be located within a furnace, or furnaces (not shown) for the measurement of furnace temperature, for example. The thermocouple terminals are shown connected to individual fixed contacts of first and second decks of a stepping switch 11. The movable arms 12 and 13 of the switch 11 are rotatable by means of a stepping switch motor magnet 14 through a pawl 16 and ratchet 17 arrangement, whereby the rotatable switch arms are advanced one switch position each time the magnet 14 is energized; the energization circuit for the magnet 14 being described in detail hereinbelow.

The movable arms 12 of the switch deck No. 1 are connected through a lead wire 19 to one terminal 21 of a null-point potentiometer network 22. The potentiometer network includes a circular slide wire 23 connected across a fixed voltage, such as a battery 24, through an adjustable resistor 26 and fixed resistors 27, 27. The lead wire 19 from one thermocouple terminal is connected through fixed resistors 28, 28 to the network. A lead wire 31 from the movable arm 13 of the switch deck No. 2 is adapted for connection to one input terminal 32 of a converter 33 through fixed and movable contacts 34 and 36, respectively, of a relay 37, when the said relay 37 is in the energized condition. Thus, with the relay 37 energized, the thermocouple voltage connected through the stepping switch 11 is opposed to the potential drop across a variable portion of the slide wire 23, as determined by the position of a rotatable contact 38.

The potential unbalance between a thermocouple 10 and the voltage derived from the potentiometric network 22 (when the relay 37 is energized) is fed to the input terminals 32, 32' of the converter 33, which converter may be of any suitable type, such as a vibrator. A typical vibrator includes a movable contact which is actuated in opposite directions to alternately make and break electrical contact with a pair of spaced fixed contacts. Vibration of the movable contact is obtained by use of the source of alternating potential 41 connected through a switch 42 and lead wires 43 and 44 to terminals 46 and 47 in the vibrator. The vibrator opens and closes the series connected thermocouple and potentiometric network circuits at the frequency of the alternating source 41. By use of a suitably connected transformer, having a center-tapped primary winding in the vibrator circuit, the potential unbalance between the thermocouple and potentiometric network is converted to a pulsating potential at the vibrator output terminals 48 and 49. With the relay 37 in the illustrated deenergized condition, a potential source derived from a shunt-connected battery or potential source 51 and potentiometer 52 is substituted for a thermocouple 10; one end of the battery and potentiometer being directly connected through a lead wire 53 to the terminal 21 of the potentiometric network 22, while the movable arm of the potentiometer 52 is connected through a fixed contact 54 and the movable contact 36 to the converter input terminal 32. Thus, the setting of the potentiometer 52 determines the level of input to the recorder when the relay 37 is deenergized while the output from the thermocouple connected to the circuit through the switch 11 determines the input thereto while the relay 37 is energized.

The vibrator output terminals 48 and 49 are connected to the input terminals 56 and 57 of an amplifier 58, where the potential unbalance is amplified and appears at the amplifier output terminals 61 and 62. Power for the amplifier is supplied by the source 41, which is connected to the terminals 63 and 64 of the said amplifier. Any suitable amplifier circuitry may be used. The output terminals 61 and 62 of the amplifier 58 are connected to the control winding 66 of a two-phase, reversible, control motor 67. The reference winding 68, of the motor, is connected to the source of alternating potential 41 through a capacitor 69. The motor will thus be energized for rotation in one direction or the other, depending upon the phase of the current in the control winding 66 with respect to the current in the reference winding 68, which, in turn, will depend upon the direction of unbalance of the potentiometric circuit 22, as will be well understood by those skilled in this art. The motor 67 is connected through suitable linkage 71 to the rotatable contact 38 in the potentiometric network, and moves the contact in a direction to rebalance the potentiometric system.

The motor 67, in addition to driving the potentiometric contact 38, also serves to move a pen or stylus 73 across a chart 74, as by means of a drive pulley 76, pulleys 77, 77, and drive cable 78. The chart 74 is driven by a power driven roller, or drum, 79 which is adapted for intermittent rotation by means of a rotary solenoid 81 connected thereto by linkage shown in detail in FIGURES 2–4 and described hereinbelow. For purposes of description of FIGURE 1, it will be understood that the roller is advanced a predetermined amount each time the solenoid 81 is energized. The solenoid 81 is provided with terminals 82 and 83 to which lead wires 84 and 86 are connected and through which wires the relay may be energized.

The energization circuit for the rotary solenoid 81 may be traced to a direct current source of supply 87, with the lead wire 84 being directly connected to the negative terminal 88 thereof. The lead wire 86 is connected to a fixed contact 89 of an interrupter switch, which includes a movable contact 91 under control of the armature 92 of the motor magnet 14. When the motor magnet is energized, the contacts 89 and 91 are closed whereby a circuit from the lead wire 86 to the positive terminal 93 of the source 87 is completed through a lead wire 94. Thus, each time the motor magnet is energized, the contacts 89 and 91 are closed and the rotary solenoid 81 is energized to advance the chart 74 one step.

Energization of the motor magnet 14 may be under control of a timer switch comprising a fixed contact 96 and movable contact 97 under control of a cam member 98 driven by a motor 99. The fixed contact 96 is connected through a lead wire 101 to the terminal 93 of the supply 87, while the movable contact 97 is connected through a lead wire 102 to one terminal of the energization winding of the motor magnet 14. The other terminal of the motor magnet energization winding is connected through lead wires 107 and 84 to the terminal 88 of the supply source 87. Thus, the motor magnet 14 is energized each time the contacts 96 and 97 of the cam-operated timer are closed. As described above, the rotary solenoid 81 is energized when the interrupter switch contacts 89 and 91 are closed upon actuation of the motor magnet.

During each cycle of operation while the switch 11 is in a single switch position, the input to the recorder is derived from the battery 51 and potentiometer 52 network during the time the relay 37 is deenergized, and from the thermocouple 10 connected in the circuit when the relay 37 is energized. The energization circuit, for the control winding of the relay 37, includes a positive supply source, designated +B. The other terminal of the control winding of the relay 37 is connected to the anode 108 of a triode switching tube 109. The control grid 111 of the tube 109 is connected through a potentiometer 112 to a negative supply source, designated —C, which source serves to maintain the tube in a normally cut-off condition. The cathode 113 of the tube is connected to a common ground 114. A capacitor 116 is connected between the grid 111 and the common ground 114. With the tube 108 cut off, no plate current flows, and the relay 37 in the plate circuit remains in a deenergized condition.

Switching of the tube 109 to a condition of conducting whereby the relay 37 is energized, is effected by means of a relay 118 having normally open fixed and movable contacts 119 and 121, respectively. The relay contact 119 is connected to the common ground 114 through a relatively small resistance value resistor 122, while the contact 121 is connected directly to the grid 111 of the control tube 109. The control winding of the relay 118 is connected to the lead wires 84 and 86 through a relay network of the capacitor 123 and resistor 124. Thus, when the spring contacts 89 and 91 are closed to energize the chart drive stepping solenoid 81, the relay 118 is also energized. The charging current of the capacitor 123 flowing through the resistor 124 produces a large voltage drop across the resistor thereby delaying the energization of the relay 118, the purpose of which delay is to avoid operation of the recording stylus until the chart 74 has stopped moving following energizatoin of the solenoid 81. When the relay 118 is energized momentarily and the contacts 119 and 121 close, the capacitor 116 discharges through the relatively low value resistor 122 and the tube 109 conducts thereby energizing the relay 37. The relay 118 (and chart drive solenoid 81) are energized only momentarily, during the time the motor magnet 14 is energized, with the closure of the timer contacts 96 and 97. When the relay 118 is initially deenergized, the tube 109 remains conducting until the capacitor 116 charges sufficiently through the potentiometer 112 to cut off the said tube. The RC time constant of the potentiometer 112 and capacitor 116 is adjusted by the potentiometer to permit the potentiometric network 22 to reach a balance before the relay 37 is deenergized and the circuit is switched back to the reference potential. The potentiometric network is over-damped to assure that the stylus 73 does not overshoot when balancing. After the relay 37 is deenergized, the stylus returns to the reference level as set by the position of the potentiometer 52; the relay 37 remaining deenergized until the cycle is repeated by closure of the timing switch contacts 96 and 97.

It will be apparent that the speed of operation of the recorder will depend upon a number of factors, one of which is how rapidly the chart 74 may be stepped by the solenoid 81, which, in turn, will depend upon the inertia of the chart drive mechanism. I provide a minimum inertia chart drive system for optimum speed of operation. Reference is now made to FIGURES 2 and 3 wherein there is shown a chart frame, designated generally by the referencce numeral 131, which frame includes a pair of vertical end plate members 132 and 133. The end plate members are maintained in parallel relation a predetermined spaced distance apart by use of a rod 136 and tear-off bar 138; the rod 136 being secured to the end plates by means of screws 141 which extend through the end plates and into threaded holes in the rod member along the axis thereof, and the tear-off bar being secured to the front edges of the end plates by screws 143 extending through the bar and into tapped holes in the edge of the end plate.

The chart 74, upon which the record of the value of the thermocouple conditions is to be made, is advanced by the drive roller, or drum, 79 which is carried upon a shaft 146; the shaft 146 being rotatably supported in suitable bearings (not shown) in the end plates 132 and 133. The chart is graduated in the transverse direction in units of the condition being measured, such as temperature.

The rotary solenoid 81 for drive actuation of the chart is spring biased to a normal position, illustrated in FIGURE 3, and returns to such position when deenergized following energization thereof. A pair of crank pins 147 and 148 extend from a plate 151 secured to the end of a shaft 152 of the solenoid, which pins are parallel with but spaced from the shaft axis. The one pin 147 engages a slot 153 formed in an arm 154 pivotally mounted on the shaft 146; the shaft 146 extending through a hole 156 in the arm, as seen in FIGURE 2. The arm 154 carries a resilient leaf spring pawl 157, which is in engagement with a ratchet wheel 159 fixedly secured to the shaft 146. A spring 161 engages the ratchet wheel for impositively locking the wheel at predetermined rotary positions. When the solenoid 81 is energized, the plate 151 with the pin 147 attached thereto is rotated counterclockwise in the direction of the arrow 163, as shown in FIGURE 3. A counterclockwise rotation of the pin 147 about the solenoid axis provides a clockwise rotation of the arm 154 in the direction of the arrow 164 through the pin 147 and slot 153 connection. The clockwise rotation of the arm 154 is imparted to the chart drive drum shaft 146 through the pawl 157 and ratchet wheel 159 connection. The arm 154 is pivoted a sufficient distance to provide one step advance of the pawl and ratchet connection. It will be seen, then, that the chart 74 is advanced a predetermined amount in the direction of the arrow 166 each time the solenoid is energized. The energized condition of the solenoid is shown in FIGURE 4, to which figure reference is also made.

The chart 74 is unwound from a chart supply roll 171 which is wound upon a cylindrical supply core, or tube, 172. The support for the supply tube may be of any conventional design. In the drawings, I have shown a pair of discs 173, 173 having axially extending hubs 174, 174 formed thereon which extend in the tube 172. The disc and hub to the right side of the tube, as viewed in FIGURE 2, are mounted on a shaft 176 rotatably supported in a bearing in the end plate 133. Suitable means, not shown, limit axial movement thereof. The disc and hub to the left side of the tube are mounted on a shaft 177 rotatably and axially movable in a bearing in the end plate 132. A spring 178 between the plate 132 and one disc 173 resiliently biases the left hand hub 174 and disc 173 against the supply roll for support thereof.

The drive drum 79 is provided with timing pins 181 which extend through apertures, or perforations 182 in the margin of the chart thereby providing a driving engagement between the chart and drive drum.. From the supply roll 171, the chart is drawn over the fixed rod 136, a reciprocally moving, or swinging, rod 183 and a pivotable shaft 184, and thence to the drive drum 79. From the drive drum, the chart is free to fall, by gravity, over a plate 186 and past the tear-off bar 138.

The bar 183 is included in a novel mechanism of my invention for intermittently drawing the chart off the supply roll while the drive roller is stationary. The rod 183 is mounted between a pair of lever arms, designated 188 and 188′, adjacent one end of the arms. The lever arms 188 and 188a are secured to the shaft 184 which shaft is pivotally supported between the upright side members 132 and 133. The arm 188a has a slot 191 formed therein, within which slot the pin 148 extends. Hence, it will be apparent that when the rotary solenoid 81 is energized, the plate 151 with the pin 148 attached thereto, drives the arm 188 in a clockwise direction about the shaft 184, from what might be termed an initial position, as viewed in FIGURE 4, to what might be termed a second position, as viewed in FIGURE 3, through the pin 148 and slot 191 connection. The clockwise direction of rotation of the arm 188 is imparted to the rod 183 thereby releasing a loop, or slack portion, designated 74′, of the chart 74 formed between the shaft 184, swinging rod 183 and fixed rod 136. Simultaneously therewith, the chart drive roll is rotated to take up the resultant slack in the chart, but without rotation of the supply roll. The chart is drawn off the supply roll only when the solenoid 81 is deenergized and the rod 183 swings back to the initial position shown in FIGURE 3 under the influence of its biasing or return spring, wherein the loop portion 74′ is again formed. In moving the chart over the drive roll, it will be apparent that substantially only the weight of the chart between the supply and drive drums contribute to the inertia thereof since the supply roll is not rotated by the rotation of the drive drum. The resultant alternate drive actuation of the chart by the drive roller and removal of the chart from the supply roller results in a mechanism in which the drive drum may be driven quickly in a minimum of time. The time required for the bar 183 to form a loop in the chart, i.e., the time necessary for the rotary solenoid 81 to return to the normal deenergized position, is not critical since the printing operation of the stylus along the chart may be initiated as soon as the chart stops. Any delay in removal of the chart from the supply roll, due to inertia of the supply roll, does not affect the speed at which the thermocouples may be scanned. Instead, other factors, such as the speed at which the stylus may be moved across the chart, limit the speed at which the recorder may be operated.

Having now described my invention in detail, in accordance with the requirements of the Patent Statutes, various changes and modifications will suggest themselves to those skilled in this art. It is intended that such changes and modifications shall fall within the spirit and scope of the claims appended hereto.

I claim:

1. In a recording instrument, or the like, having a supply roll with a strip chart, or the like, wound thereon, means rotatably supporting the said roll, a drive drum drivingly engaging the said chart, a pivotal lever, a rod extending from the side of the lever, the said rod extending transversely of the chart and engaging the chart between the supply roll and drive drum, a rotary solenoid, means including a pawl and ratchet connecting the said solenoid to the drive drum for intermittent rotation of the drive drum upon energization of the solenoid, means connecting the said solenoid to the said pivotal lever for reciprocally pivoting the same, the said rod moving in a direction away from the chart when the solenoid is energized and in a direction toward the chart when the solenoid is deenergized, the chart being unwound from the supply roll upon deenergization of the solenoid.

2. In a recording instrument, or the like, having a supply roll with a strip chart, or the like, wound thereon, means rotatably supporting said roll, a drum for driving said chart, a pivoted lever, a rod extending from the side of said lever near one end transversely of and engaging the chart between the supply roll and drive drum, the other end of said lever having a slot, a rotary solenoid with a crank pin extending from an end and received in said slot, one-way drive means connecting said solenoid to the drive drum for alternate rotation and non-rotation of said drum, and the crank pin in said lever slot serving to transmit motion from said solenoid to said rod for moving it in a direction away from the chart when the drum is rotated and in a direction toward the chart when the drum is not rotated, in order to then unwind the chart from the supply roll.

3. In a recording instrument, or the like, having a supply roll with a strip chart, or the like, wound thereon, means rotatably supporting said roll, a drum drivingly engaging said chart, means including a member operating between initial and second positions for operating the drive drum to drive the chart thereover during operation to second position and allowing the chart to remain stationary during a return to initial position, a pivotal lever, a rod extending from a side of said lever transversely of and engaging the chart between the supply roll and drive drum, a shaft on which said pivotal lever is mounted, said strip chart passing from said supply roll on one side of said rod, past the side of said shaft remote from that of the rod which is engaged by said chart to said drive drum, and the member for operating the drive drum engaging the pivotal lever and swinging said rod away from the chart when said drum is driven and toward the chart while stationary.

References Cited in the file of this patent

UNITED STATES PATENTS

| | | |
|---|---|---|
| 1,400,287 | Leumann | Dec. 20, 1921 |
| 1,648,769 | Hugo | Nov. 8, 1927 |
| 1,941,597 | Cavagnaro | Jan. 2, 1934 |
| 1,981,256 | Von Pein | Nov. 20, 1934 |
| 2,530,961 | Hansen | Nov. 21, 1950 |
| 2,536,066 | Krueger | Jan. 2, 1951 |
| 2,957,638 | Schiller et al. | Oct. 25, 1960 |
| 3,025,017 | Wahlstrom | Mar. 13, 1962 |